US008507618B2

(12) United States Patent
Schäfer et al.

(10) Patent No.: US 8,507,618 B2
(45) Date of Patent: Aug. 13, 2013

(54) SILOXANE MIXTURES CONTAINING EPOXIDE RESINS AND METHOD FOR THE PREPARATION THEREOF AND USE THEREOF

(75) Inventors: Oliver Schäfer, Burghausen (DE); Helmut Oswaldbauer, Stubenberg (DE)

(73) Assignee: Wacker Chemie AG, Munich (DE)

( * ) Notice: Subject to any disclaimer, the term of this patent is extended or adjusted under 35 U.S.C. 154(b) by 258 days.

(21) Appl. No.: 13/131,475

(22) PCT Filed: Nov. 20, 2009

(86) PCT No.: PCT/EP2009/065515
§ 371 (c)(1),
(2), (4) Date: May 26, 2011

(87) PCT Pub. No.: WO2010/060861
PCT Pub. Date: Jun. 3, 2010

(65) Prior Publication Data
US 2011/0237761 A1    Sep. 29, 2011

(30) Foreign Application Priority Data

Nov. 28, 2008   (DE) .......................... 10 2008 044 199

(51) Int. Cl.
| | | |
|---|---|---|
| B32B 17/04 | (2006.01) | |
| B32B 27/04 | (2006.01) | |
| C08K 3/00 | (2006.01) | |
| C08L 33/02 | (2006.01) | |
| C08L 33/08 | (2006.01) | |
| C08L 33/10 | (2006.01) | |
| C08L 61/10 | (2006.01) | |
| C08L 61/24 | (2006.01) | |
| C08L 61/28 | (2006.01) | |
| C08L 63/00 | (2006.01) | |
| C08L 63/02 | (2006.01) | |
| C08L 67/02 | (2006.01) | |
| C08L 67/06 | (2006.01) | |
| C08L 67/08 | (2006.01) | |
| C08L 75/04 | (2006.01) | |
| C08L 83/06 | (2006.01) | |
| C08L 83/07 | (2006.01) | |
| C08L 83/10 | (2006.01) | |

(52) U.S. Cl.
USPC ............... 525/476; 252/182.18; 428/297.4; 428/391; 525/100; 525/446; 525/453; 525/477; 525/479

(58) Field of Classification Search
None
See application file for complete search history.

(56) References Cited

U.S. PATENT DOCUMENTS

| | | | |
|---|---|---|---|
| 4,853,434 A | 8/1989 | Block | |
| 5,079,313 A | 1/1992 | Okuno | |
| 5,284,938 A | 2/1994 | Dangayach | |
| 5,854,369 A | 12/1998 | Geck | |
| 2006/0205861 A1* | 9/2006 | Gordon et al. | ................ 524/506 |
| 2009/0197989 A1 | 8/2009 | Ebenhoch | |

FOREIGN PATENT DOCUMENTS

| | | |
|---|---|---|
| DE | 3938157 | 5/1990 |
| EP | 0230619 | 8/1987 |
| EP | 0266513 | 5/1988 |
| EP | 620242 A2 * | 10/1994 |
| EP | 0676448 | 10/1995 |
| EP | 744432 | 11/1996 |
| JP | 03-054212 | 3/1991 |
| JP | 2008-106161 A * | 5/2008 |
| JP | 2010-024266 | 2/2010 |
| WO | 2006037559 | 4/2006 |

OTHER PUBLICATIONS

English Patent Abstract for JP 2010-024266.
English Patent Abstract for JP 03-054212.
International Search Report for PCT/EP2009/065515 filed Nov. 20, 2009, mailed Feb. 25, 2010.

* cited by examiner

*Primary Examiner* — Robert Sellers
(74) *Attorney, Agent, or Firm* — RatnerPrestia

(57) ABSTRACT

Composition comprising (A) 50-99.5 wt %, based on the total weight, of A, B and C of a reaction resin or reaction resin mixture that is processed into thermosetting materials, said resin or resin mixture being liquid at temperatures in the range of 15 to 100° C. and having an average molecular weight of 200 to 500,000 and with a sufficient number of suitable reactive groups for a curing process and (B) 0.5-50 wt %, relative to the total weight of A, B and C of one or more dispersed polyorganosiloxanes that are contained in the reaction resin or reaction resin mixture homogeneously in finely distributed form as polyorganosiloxane droplets with a diameter of 0.001 to 4 μm, wherein the organopolysiloxane particle is a polymer of the general formula $(R_3SiO_{1/2})_w(R_2SiO_{2/2})_x(RSiO_{3/2})_y(SiO_{4/2})_z$, where w=0 to 20 Mol %, x=80 to 99.9 Mol %, y=0.5 to 10 Mol %, z=0 to 10 Mol %, (C) 0.1-50 wt %, based on the total weight of A, B and C of one or more silicone organo copolymers as dispersing agents that can be homogeneously dissolved or homogeneously emulsified in the reaction resin or reaction resin mixture.

10 Claims, No Drawings

SILOXANE MIXTURES CONTAINING EPOXIDE RESINS AND METHOD FOR THE PREPARATION THEREOF AND USE THEREOF

CROSS REFERENCE TO RELATED APPLICATIONS

This application is the national phase filing of international patent application No. PCT/EP2009/065515, filed 20 Nov. 2009, and claims priority of German patent application number 10 2008 044 199.6, filed 28 Nov. 2008, the entireties of which applications are incorporated herein by reference.

FIELD OF THE INVENTION

This invention relates to an epoxy resin comprising a siloxane mixture and to the use of said resin in the manufacture of thermoset plastics having improved mechanical properties such as fracture toughness and impact toughness.

BACKGROUND OF THE INVENTION

Crosslinked epoxy resins have a mostly very high crosslink density and so have some valuable properties, making them the most widely used polymers alongside thermoplastics. Among these properties are their hardness, strength, chemical resistance and thermal stability. This makes these epoxy resins suitable for applications in a very wide variety of fields, for example for the production of fiber-reinforced plastics, for insulation materials in electrical engineering, in the manufacture of engineering adhesives, high-pressure laminates, stoving enamels and so forth.

Thermosets also have a serious disadvantage which often prevents their use. Because of their highly crosslinked condition, they have very little impact toughness. This applies particularly to the low-temperature range, i.e., temperatures below 0° C., and so thermoplastic polymers are normally preferred for applications where the thermoset might be exposed to high mechanical loads, e.g., impacts, at low temperatures, although the use of thermoplastic polymers does mean that disadvantages associated therewith, such as lower heat resistance and chemical resistance, have to be accepted.

Several methods have been developed to improve the impact toughness or flexibility of thermosets.

Most of these methods have the purpose to incorporate elastic components as impact modifiers in the reactive resins.

It is known to add pulverulent, soft fillers, such as rubber powder or elastomeric powders of polymer, to reactive resins. The particle size of pulverulent additives of this type is in the range from about 0.04 to 1 mm, and this is evidently not sufficient to achieve the desired type of improvement in these reactive resins, and there are also attendant disadvantages for other important performance characteristics of thermosets modified in this way.

Plasticizers are added in an attempt to improve the impact toughness of crosslinked epoxy resins. This does achieve improved impact toughness, but unfortunately at the cost of sacrificing other essential properties of these thermosets. In addition, the use of plasticizers entails a latent risk of exudation after the crosslinking of the reactive resin, with the associated negative consequences for surface properties of the material, such as adherence, coatability or gloss.

It is also known to use liquid or solid but non-crosslinked butadiene-acrylonitrile rubbers (nitrile rubber, NBR) as toughness-improving additives in reactive resins. These elastomers contain functional groups which can be reacted with the reactive resin during the crosslinking step or else in an earlier reaction. Reaction between the reactive resin and the functional groups positioned at the surface of the nitrile rubber particles produces a firm attachment of the rubber phase to the thermoset matrix.

However, these nitrile rubber-modified thermosets unfortunately also have significant shortcomings. For instance, the thermal stability of thermosets becomes inferior on modification with nitrile rubber, and so calls the high-temperature utility of thermosets modified with nitrile rubber into question. The same applies to many electrical properties, such as dielectric strength for example. Because the compatibility of the nitrile rubber with most epoxy resins is relatively good, a certain proportion of the rubber does not participate in the phase separation of crosslinking and becomes incorporated in the resin matrix, impairing the performance profile of the final thermoset. A further disadvantage is the very high viscosity of the nitrile rubber modifiers, which leads to processing problems and impairs the flow properties of the modified reactive resin. U.S. Pat. No. 5,284,938 discloses using siloxane-polyester copolymers as impact modifiers in epoxy resins. Unfortunately, they have the disadvantage of greatly reducing the stiffness of the epoxy resins, which is not always desirable.

EP 0266513 B1 describes modified reactive resins, processes for their production and their use. In effect, functionalized crosslinked organopolysiloxane rubbers are produced in situ in the resin to be used. It is restricted to compositions which, in addition to a reactive resin, include a maximum of 2-50% by weight of three-dimensionally crosslinked polyorganosiloxane rubbers having particle sizes of 0.01 to 50 micrometers in amounts of 2-50% by weight, although the properties of the composition described therein are inadequate in terms of impact strength and impact toughness. Again, the flow properties of the epoxy resin thus modified are adversely affected.

WO2006037559 describes modified reactive resins and also processes for their production. Solutions of preformed particles in organic solutions are mixed with reactive resins and the reactive resins of the invention are recoverable by subsequently removing the solvent. The disadvantage with this process is the fact that the solvent quantities are very large at times and are very costly and inconvenient to remove again, and if they are not completely removed, can lead to defects in the material during the curing of the reactive resins.

SUMMARY OF THE INVENTION

It is an object of the present invention to improve on the prior art and produce a homogeneous reactive resin which, after curing and shaping, exhibits improved properties in terms of impact strength and impact toughness and also, where appropriate, only low conductivity values.

DETAILED DESCRIPTION OF THE INVENTION

The present invention accordingly provides a composition comprising
(A) 50-99.5% by weight based on the total weight of A, B and C of a reactive resin or reactive resin mixture which can be processed to give thermosets, and which is liquid at temperatures in the range from 15 to 100° C. and has an average molecular weight of from 200 to 500 000, and has a sufficient number of suitable reactive groups for the curing process, and
(B) 0.5-50% by weight based on the total weight of A, B and C of one or more dispersed polyorganosiloxanes, the viscosity of which is preferably in the range from 0.65 to 2 000 000 mPa·s, preferably in the range from 10 to 100 000 mPa·s and more preferably in the range from 100 to 10 000 mPa·s, and which are present homogeneously in finely dispersed form as polyorganosiloxane droplets having a diameter of preferably from 0.001 to 4 µm, more preferably from 0.01 to 0.8 µm and even more preferably from 0.02 to 0.4 µm in the reactive resin or reactive resin mixture, wherein the organopolysiloxane particle is a polymer of the general formula $(R_3SiO_{1/2})_w$·$(R_2SiO_{2/2})_x$·$(RSiO_{3/2})_y$·$(SiO_{4/2})_z$ where w=0 to 20 mol %, x=80 to 99.59 mol %, y=0.5 to 10 mol %, z=0 to 10 mol %, (C) 0.1-50% by weight based on the total weight of A, B and C of one or more organosilicone copolymers as dispersants, which form a homogeneous solution or emulsion in the reactive resin or reactive resin mixture.

The R radicals are preferably hydrogen or alkyl radicals, such as methyl, ethyl, n-propyl, isopropyl, n-butyl, sec-butyl, amyl, hexyl; alkoxy radicals such as methoxy or ethoxy; alkenyl radicals, such as vinyl and allyl and butenyl; aryl radicals, such as phenyl; or substituted hydrocarbon radicals. Examples thereof are halogenated hydrocarbon radicals, such as chloromethyl, 3-chloropropyl, 3-brompropyl, 3,3,3-trifluoropropyl and 5,5,5,4,4,3,3-heptafluoropentyl, and also chlorophenyl; mercaptoalkyl radicals, such as 2-mercaptoethyl and 3-mercaptopropyl; cyanoalkyl radicals, such as 2-cyanoethyl and 3-cyanopropyl; aminoalkyl radicals, such as 3-aminopropyl; (meth)acryloyloxyalkyl radicals, such as 3-acryloyloxypropyl and 3-methacryloyloxypropyl; hydroxyalkyl radicals, such as hydroxypropyl; or epoxy radicals such as glycidyloxypropyl.

Particular preference is given to methyl, ethyl, propyl, phenyl, vinyl, 3-methyacryloyloxypropyl, 1-methacryloyloxymethyl, 1-acryloyloxymethyl and 3-mercaptopropyl, subject to the proviso that less than 30 mol % of the radicals in the siloxane polymer are vinyl, 3-methacryloyloxyopropyl or 3-mercaptopropyl groups.

The finely divided siloxane droplets preferably have an average particle size (diameter) in the range from 1 to 4000 nm, more preferably in the range from 10 to 800 nm and even more preferably 20-400 nm, as measured using a transmission electron microscope.

The polyorganosiloxane droplets may display reactive groups which, prior to or during the further processing of the modified reactive resin (A), react chemically with the reactive resin, optionally together with small amounts of assistants, particularly crosslinking agents, catalysts and/or curing agents.

The modified reactive resin A is preferably further characterized in that the content of sodium, magnesium or calcium ions is below 50 ppm and also in that the content of chloride and sulfate ions is likewise below 50 ppm.
The content of residual solvent is preferably less than 0.3% by weight and even more preferably less than 0.1% by weight.

Particular preference is given to dispersants/emulsifiers C composed of siloxane-containing block copolymers or siloxane-containing graft polymers wherein one portion of the copolymer has to be a siloxane portion. Preference is given to siloxane-containing block copolymers comprising siloxane units having a molecular weight of preferably 1000-10 000 g/mol. The organic portion of the organosiloxane copolymer is preferably constructed of (co)polymers of methyl methacrylate or of aliphatic polyesters.

It is very particularly preferable for said dispersant C to be a polysiloxane-polycaprolactone block copolymer comprising a siloxane unit having a molecular weight of 1500-4000 g/mol, preferably from 2000 to 3000.

The viscosity of the dispersant C is preferably below 20 Pa*s in the temperature range from 20 to 100° C.

The reactive resin A modified according to the present invention preferably comprises from 0.5% to 50% by weight, more preferably from 1% to 15% by weight and even more preferably from 2% to 10% by weight of one or more dispersed organopolysiloxanes (B) based on the sum total of A+B+C.

A suitable reactive resin A for the purposes of the present invention is any polymeric or oligomeric organic compound having a sufficient number of suitable reactive groups for a curing reaction. The starting material for producing the reactive resin modified according to the present invention is generally any reactive resin processable into a thermoset, irrespective of the particular crosslinking mechanism taking place in the curing of the particular reactive resin.

In principle, the reactive resins that can be used as starting materials can be classified into three groups according to whether crosslinking proceeds by addition, by condensation or by polymerization.

From the first group, the reactive resins crosslinked by polyaddition, it is preferable to select one or more epoxy resins, urethane resins and/or air-drying alkyd resins as starting material. Epoxy and urethane resins are generally crosslinked by adding stoichiometric amounts of a hardener containing hydroxyl, amino, carboxyl or carboxylic anhydride, and the curing reaction takes place here by addition of the oxirane or isocyanate groups of the resin onto the corresponding groups of the hardener. In the case of epoxy resins, there is also the possibility of so-called catalytic curing through polyaddition of the oxirane groups themselves. Air-drying alkyd resins crosslink through auto-oxidation with atmospheric oxygen. Addition-curing silicone resins are also known, preferably with the proviso that no further free silanes are present.

Examples of the second group, the reactive resins crosslinked by polycondensation, are preferably condensates of aldehydes, e.g. formaldehyde, with aliphatic or aromatic compounds containing amine groups, e.g., urea or melamine, or with aromatic compounds such as phenol, resorcinol, cresol, etc., and also furan resins, saturated polyester resins and condensation-curing silicone resins. Curing mostly takes place here via temperature elevation with elimination of water, low molecular weight alcohols or other low molecular weight compounds. The starting material preferably selected for the reactive resins modified according to the present invention comprises one or more phenolic resins, resorcinol resins and/or kresol resins, and specifically not only resols but also novolaks, also urea, formaldehyde and melamine-formaldehyde precondensates, furan resins and also saturated polyester resins and/or silicone resins.

From the third group, the reactive resins crosslinked by polymerization, one or more homo- or copolymers of acrylic acid and/or methacrylic acid or esters thereof, also unsaturated polyester resins, vinyl ester resins and/or maleimide resins are preferable for use as starting resins for the reactive resins modified according to the present invention. These resins have polymerization-capable double bonds, the polymerization or copolymerization of which brings about three-dimensional crosslinking. Compounds capable of forming free radicals are used as initiators, examples being peroxides, peroxo compounds or azo-containing compounds. Another possibility is to initiate the crosslinking reaction using high-energy radiation, such as UV or electron beam radiation.

It is not just the aforementioned reactive resins but also any of the other reactive resins suitable for the production of thermoset plastics that can be modified in the manner proposed according to the present invention to produce, after crosslinking and curing, thermosets having appreciably improved fracture and impact toughness while other essential properties characteristic to thermosets, such as strength, heat resistance and chemical resistance, remain substantially unaffected. And it is immaterial here whether the reactive resins are solid or liquid at room temperature. Nor is the molecular weight of the reactive resins of any practical concern. Compounds often used as hardener components for reactive resins, for example phenolic resins or anhydride hardeners, can also be considered to be reactive resins.

The following are preferable for inclusion as reactive resins in the composition of the present invention: epoxy resins, such as bisphenol-A diglycidyl ether, bisphenol-F diglycidyl ether, novolak-epoxy resins, epoxy resins containing biphenyl units, aliphatic or cycloaliphatic epoxy resins, such as 3,4-epoxycyclohexylmethyl 3,4-epoxycyclohexanecarboxylate. All the epoxy resins can differ to some extent from the monomeric structure, depending on the degree of condensation during the production process. It is further possible to use acrylate resins for the compositions of the present invention.

Examples of preferred acrylate resins are triethylene glycol dimethacrylate, urethane dimethacrylate, glycidyl methacrylate. Phenolic resins, urethane resins and silicone resins can also be used, the latter preferably with the proviso that no further free silanes be present.

Process for producing epoxy resins comprising siloxane mixture, characterized in that
(A) 50-99.5% by weight based on the total weight of A, B and C of a reactive resin or reactive resin mixture which can be processed to give thermosets, and which is liquid at temperatures in the range from 15 to 100° C. and has an average molecular weight of from 100 to 500 000, and has a sufficient number of suitable reactive groups for the curing process, and
(B) 0.5-50% by weight based on the total weight of A, B and C of one or more polyorganosiloxanes of the general formula $(R_3SiO_{1/2})_w(R_2SiO_{2/2})_x \cdot (RSiO_{3/2})_y \cdot (SiO_{4/2})_z$ where w=0 to 20 mol %, x=80 to 99.9 mol %, y=0.5 to 10 mol %, z=0 to 10 mol %, and the dispersant
(C) 0.1-50% by weight based on the total weight of A, B and C of one or more organosilicone copolymers (based on the sum total of A+B+C)
are mixed together at temperatures of 0° C. to 180° C., wherein the (B) polyorganosiloxane droplets are dispersed homogeneously in finely divided form as polyorganosiloxane drops having a diameter of preferably from 0.001 to 4 μm, more preferably from 0.01 to 0.8 μm and even more preferably from 0.02 to 0.4 μm in the reactive resin.

In the process, the siloxane B is present in amounts of 50% to 1000% by weight, preferably in amounts of 100% to 700% by weight and even more preferably in amounts of 200% to 500% by weight, based on the amount of dispersant C.

The components are mixed at temperatures of 0° C. to 180° C. and preferably at temperatures of 10° C. to 100° C., to homogeneously disperse the polyorganosiloxane droplets in the reactive resin. Apparatus that can be used here includes inter alia stirrers, dissolvers, kneaders, roll mills, high-pressure homogenizers, ultrasound homogenizers and "Ultra-Turrax" dispersion equipment. The temperatures employed must not cause any noticeable crosslinking of the reactive resins during the dispersing stage.

Further solvents can optionally be added here, but it is preferable to avoid the use of solvents here.

Further fillers can optionally be added here.

This inventive mixture of reactive resin and polyorganosiloxanes can optionally contain yet further siloxane particles, as described in EP 744 432 A or EP 0 266 513 B1 for example.

The modified reactive resins according to the present invention have a number of advantages over comparable known products and therefore can be used with advantage in numerous fields. These advantages include primarily the improvement in the fracture and impact toughness of thermoset plastics, not only at very low temperatures extending down to −50° C. depending on the polyorganosiloxane used, but also at very high temperatures, i.e., up to the softening temperature of the particular thermoset. Another important point is that the modification does not exert any adverse effect on hardness, strength and softening temperature of the crosslinked reactive resin. The elastomer component endows the reactive resin cured according to the present invention with high resistance to aging, to weathering, to light and to temperature changes, without any resultant adverse effect on the characteristic properties of the thermoset itself. Nor is there any adverse effect on electrical properties, in particular the insulator properties of the reactive resin, particularly at comparatively high temperatures.

The impact-modified reactive resins of the present invention can be processed in a conventional manner. The reactive resins modified according to the present invention are useful for any field of use in which thermosets are typically used. They are also particularly useful for applications in which straight thermosets could not hitherto be used because their fracture toughness and impact toughness were unsatisfactory. Suitable uses for the reactive resins modified according to the present invention are particularly the production of fracture- and impact-tough, shaped or unshaped thermoset plastics, fiber-reinforced plastics, insulation materials in electrical engineering and high-pressure laminates. Owing to their minimal contribution to the viscosity of the epoxy resin, the products of the present invention are also useful for RIM techniques.

It was found that the composition proposed according to the present invention provides a modified reactive resin which in the subsequent, conventional shape-conferring processing and curing, gives a thermoset plastic which, when compared with unmodified thermosets or with thermosets not modified in the same way, has appreciably improved fracture toughness, more particularly impact toughness, while the other properties advantageous for thermosets, such as thermal stability, strength and chemical resistance, are only insignificantly impaired, if at all.

Substances:

RIM 135: mixture of a bisphenol-A bisglycidyl ether and hexanediol bisglycidyl ether having a viscosity of 800 mPas, from Hexion RIM 137: amine hardener from Hexion comprising isophoronediamine having a viscosity of 20 mPas AK 1000: trimethylsilyl-terminated polydimethylsiloxane having a viscosity of 1000 mPas (Wacker Chemie AG)

AK100: trimethylsilyl-terminated polydimethylsiloxane having a viscosity of 100 mPas (Wacker Chemie AG)

CT601: OH-terminated polydimethylsiloxane having a viscosity of 300 mPas (Wacker Chemie AG)

FLUID NH 130 D: bisaminopropyl-terminated polydimethylsiloxane having a viscosity of 290 mPas (Wacker Chemie AG)

Example 1

Not of the Invention

Producing the Polysiloxane-Polycaprolactone Block Copolymer:

800 g of a bishydroxypropyl-terminated polydimethylsiloxane having a molecular weight of 2750 g/mol were mixed with 800 g of ∈-caprolactone (from Solvay Caprolactones).

Then, 500 ppm of dibutyltin dilaurate were added and the reaction mixture was heated to 70° C. under stirring and maintained at 70° C. for 1 hour. This was followed by heating to 140° C. and this temperature was maintained for 6 hours under stirring. Finally, about 1 to 2% of the reaction mixture was removed (siloxane cycles and also ∈-caprolactone) under high vacuum (<10 mbar). The copolymer thus obtained was finally cooled down and pelletized.

A polyorganosiloxane-polycaprolactone block copolymer having a siloxane content of 50% by weight and an average molecular weight of 5180 g/mol was obtained.

Examples 2-7

Of the Invention

The copolymer obtained in Example 1 was mixed with various polyorganosiloxanes at about 60° C. to form homogeneous mixtures.

|  | Example 2* | Example 3 | Example 4 | Example 5 | Example 6 | Example 7 |
| --- | --- | --- | --- | --- | --- | --- |
| polysiloxane | — | AK 100 | AK 1000 | CT 601 | FLUID NH 130 D | AK 100 |
| polysiloxane viscosity | — | 100 mPas | 1000 mPas | 290 mPas | 410 mPas | 100 mPas |
| polysiloxane organocopolymer (C) | Example 1 | Example 1 | Example 1 | Example 1 | Example 1 | — |
| polysiloxane quantity | 0 g | 300 g | 300 g | 300 g | 300 g | 400 g |
| polysiloxane organocopolymer quantity | 400 g | 100 g | 100 g | 100 g | 100 g | 0 g |
| mixture quantity | 400 g | 400 g | 400 g | 400 g | 400 g | 400 g |
| theoretical modifier content | 100% | 100% | 100% | 100% | 100% | 100% |
| appearance of mixture | clear | translucent, no sediment | translucent, no sediment | translucent, no sediment | translucent, no sediment | clear |

*not of the invention

Performance Testing:

Examples 8-14

Producing Modified Epoxy Resins

The mixtures obtained in Examples 2-5 were mixed into various reactive resins at 60° C. in varying weight ratios using a rotor-stator mixer (Ultra-Turrax) for about 5 minutes, during which the temperature rose to about 70° C. After addition of the hardener and of an accelerant, the mixture was homogenized once more, devolatilized and cured in aluminum molds at elevated temperatures (15 h at room temperature and 15 h at 80° C.)

|  | Example 8* | Example 9* | Example 10 | Example 11 | Example 12 | Example 13 | Example 14 |
| --- | --- | --- | --- | --- | --- | --- | --- |
| mixture used | — | Example 2 | Example 3 | Example 4 | Example 5 | Example 6 | Example 7 |
| mixture quantity |  | 43 g | 43 g | 43 g | 43 g | 43 g | 43 g |
| reactive resin | RIM 135 (Hexion) | RIM 135 (Hexion) | RIM 135 (Hexion) | RIM 135 (Hexion) | RIM 135 (Hexion) | RIM 135 (Hexion) | RIM 135 (Hexion) |
| reactive resin type | epoxy | epoxy | epoxy | epoxy | epoxy | epoxy | epoxy |
| quantity of reactive resin A (epoxy) | 300 g | 300 g | 300 g | 300 g | 300 g | 300 g | 300 g |
| quantity of reactive resin B (anhydride) | RIM 137 (Hexion) 90 g | RIM 137 (Hexion) 90 g | RIM 137 (Hexion) 90 g | RIM 137 (Hexion) 90 g | RIM 137 (Hexion) 90 g | RIM 137 (Hexion) 90 g | RIM 137 (Hexion) 90 g |
| theoretical modifier content | 0% | 10% | 10% | 10% | 10% | 10% | 10% |
| appearance of thermoset | transparent | white | white | white | white | white | white, heterogeneous |
| impact toughness, 23° C. (kJ/M2) 8 mm plate | 9.58 | 13.84 | 13.74 | 13.67 | 13.58 | 13.68 | 6.54 |
| modulus, 4 mm plate, bending test | 3431 MPa | 2523 | 3039 | 3025 | 2953 | 2889 | not measurable |

|  | Example 8* | Example 9* | Example 10 | Example 11 | Example 12 | Example 13 | Example 14 |
|---|---|---|---|---|---|---|---|
| particle size | 100-200 nm | approx. 200 nm | approx. 200 nm | approx. 200 nm | approx. 100 nm | approx. 150 nm | >1000 nm |

*not of the invention

The examples show that the dispersible siloxanes provide a simple way to obtain curable mixtures of various epoxy resins at various concentrations in order thereby to improve the impact toughness of the epoxy resins thus endowed. These are further notable for high moduli compared with other modifiers used. The emulsifier component therein is urgently needed to disperse the siloxane homogeneously in the reactive resin.

What is claimed is:

1. A composition comprising (A) 50-99.5% by weight based on the total weight of A, B and C of a reactive resin or reactive resin mixture which can be processed to give thermosets, and which is liquid at temperatures in the range from 15 to 100° C. and has an average molecular weight of from 200 to 500,000, and has a sufficient number of suitable reactive groups for the curing process, and (B) 0.5-50% by weight based on the total weight of A, B and C of one or more dispersed polyorganosiloxanes, which are present homogeneously in finely dispersed form as polyorganosiloxane droplets having a diameter of from 0.001 to 4 μm in the reactive resin or reactive resin mixture, wherein the polyorganosiloxane droplets are a polymer of the general formula $(R_3SiO_{1/2})_w$ $(R_2SiO_{2/2})_x$.$(RSiO_{3/2})_y$.$(SiO_{4/2})_z$ wherein w=0 to 20 mol %, x=80 to 99.9 mol %, y=0.5 to 10 mol %, z=0 to 10 mol %, or a polymer of the general formula $(R_3SiO_{1/2})_w$ $(R_2SiO_{2/2})_x$ wherein w=0.1 to 20 mol % and x=80 to 99.9 mol %; wherein R is selected from the group consisting of hydrogen, substituted or unsubstituted alkyl, alkoxy, alkenyl, substituted or unsubstituted aryl, mercaptoalkyl, cyanoalkyl, aminoalkyl, (meth)acryloyloxyalkyl, hydroxyalkyl and epoxy, and (C) 0.1-50% by weight based on the total weight of A, B and C of one or more siloxane-containing block copolymers as dispersants, which form a homogeneous solution or emulsion in the reactive resin or reactive resin mixture.

2. The composition according to claim 1, wherein A is an epoxy resin, a vinyl ester resin or an unsaturated polyester resin.

3. The composition according to claim 1, wherein said dispersant C is a polysiloxane-polycaprolactone block copolymer comprising a siloxane unit having a molecular weight of 1500-4000 g/mol.

4. A fracture- and impact-tough solid thermoset plastics article comprising a composition according to claim 1.

5. An insulation material comprising a composition according to claim 1.

6. A fiber composite material comprising a composition according to claim 1.

7. The composition according to claim 2, wherein B is droplets of a polyorganosiloxane polymer of the general formula $(R_3SiO_{1/2})_w(R_2SiO_{2/2})_x$ wherein w=0.1 to 20 mol %, x=80 to 99.9 mol %.

8. The composition according to claim 2, wherein said dispersant C is a polysiloxane-polycaprolactone block copolymer comprising a siloxane unit having a molecular weight of 1500-4000 g/mol.

9. The composition according to claim 1, wherein said dispersant C is a polysiloxane-polycaprolactone block copolymer comprising a siloxane unit having a molecular weight of 1500-4000 g/mol.

10. The composition according to claim 9, wherein A is an epoxy resin, a vinyl ester resin or an unsaturated polyester resin.

* * * * *